(12) United States Patent
Wackerly

(10) Patent No.: US 7,760,742 B2
(45) Date of Patent: Jul. 20, 2010

(54) SYSTEMS AND METHODS OF USING PSEUDO-ROUTES FOR DATA TRANSMISSIONS

(75) Inventor: Shaun C Wackerly, Lincoln, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 11/081,470

(22) Filed: Mar. 15, 2005

(65) Prior Publication Data

US 2006/0209845 A1 Sep. 21, 2006

(51) Int. Cl.
*H04L 12/28* (2006.01)

(52) U.S. Cl. .................. 370/400; 370/238; 370/395.31; 709/239; 709/241

(58) Field of Classification Search .............. 370/395.3, 370/395.5, 428, 238, 400, 401; 709/238–244
See application file for complete search history.

(56) References Cited

U.S. PATENT DOCUMENTS

| | | | | |
|---|---|---|---|---|
| 5,430,727 A | * | 7/1995 | Callon | ........................ 370/401 |
| 6,496,510 B1 | * | 12/2002 | Tsukakoshi et al. | ......... 370/401 |
| 6,883,034 B1 | * | 4/2005 | Pelavin et al. | ................ 709/242 |
| 2004/0034714 A1 | * | 2/2004 | Garakani et al. | ............. 709/238 |
| 2004/0240455 A1 | * | 12/2004 | Shen | .......................... 370/400 |
| 2005/0220123 A1 | * | 10/2005 | Wybenga et al. | ............ 370/400 |
| 2006/0056411 A1 | * | 3/2006 | Badat et al. | .................. 370/392 |

* cited by examiner

*Primary Examiner*—Aung S Moe
*Assistant Examiner*—Vinncelas Louis

(57) ABSTRACT

In some embodiments of the present invention, method of routing data packets using a pseudo-route are presented including: receiving a data packet, the data packet having a destination; calculating the pseudo-route, if the destination corresponds with at least one of a plurality of software routing table routes, the pseudo-route having a most specific non-overlapping route mask derived from at least one of a plurality of overlapping software routing table routes; and routing the data packet using the pseudo-route. In some embodiments methods are presented further including: selecting a most specific route from the at least one of a plurality of software routing table routes corresponding with the destination. In some embodiments methods are presented further including: programmatically entering the pseudo-route into a hardware routing table.

22 Claims, 4 Drawing Sheets

SYSTEMS AND METHODS OF USING PSEUDO-ROUTES FOR DATA TRANSMISSIONS

BACKGROUND OF THE INVENTION

As society's reliance on information technology services increases, so too does the need for more efficient and effective modes of data transmission upon which the dissemination of information relies. In a modern Internet, many millions of devices may be communicating at any given moment. Those devices require the near constant transmission and reception of data streams. Data streams may be divided into individual data packets for transmission over a data packet switching network and then reassembled at a point of reception. Data packet transmission offers many efficiencies including the ability to send data packets from the same data stream over different routes.

In order to effectively manage data packed transmission, routers may be employed to forward data packets. Some of the tasks typically assigned to a router may be: receiving data packets; storing data packet routes; selecting data packet routes; and transmitting data packets. Each of these tasks may be assigned individually or in combination to a hardware component or a software component of a typical router. Generally speaking, tasks assigned to a hardware component are more efficient than those assigned to a software component. For example, a hardware component having a routing table populated with any number of data packet routes may be much more efficient at routing data packets than a software component having similar characteristics. In some examples, hardware routing may be many thousands of times faster than a software component.

One reason for this efficiency is that hardware component routing tables are generally configured with special-purpose, fixed functionality, while software component routing tables are generally configured with generic customizable functionality. Thus, while both hardware and software routing tables may contain known and resolved routes, for example, hardware component routing may be configured to enable routing for a specific set of data packets. Software components, on the other hand, may, in some examples, require additional processing to determine an appropriate route for any number of generic data packets. In examples where a route may not be present in a hardware table, a software component may issue a query to find an appropriate route, may issue a flood for a data packet in order to find an appropriate route, or may ignore a data packet in the absence of an appropriate route. These additional tasks may require additional processing time often resulting in greater latency in a routing system.

One conventional solution to this problem is to allow a software component to programmatically modify a hardware routing table when a specific route is acquired. In this manner, new data packet routes may be more efficiently transmitted. However, this method may have drawbacks. One drawback is that a system may become increasingly unstable where many additions and deletions to a hardware routing table are constantly taking place. Special care must be taken, in those cases, to avoid overlapping routes. Further, where a hardware routing table must be maintained in a particular order, additions and deletions may require shifting the entire contents of a table for each addition and deletion. Still further, adding individual routes to a hardware routing table may not allow for the programming of a less specific route if a more specific route cannot be resolved. Thus it may be desirable to modify a hardware routing table in such a way as to avoid table instability, avoid overlapping routes, and allow less specific routes to be programmed. Therefore systems and methods of using pseudo-routes for data transmissions are presented herein.

SUMMARY OF INVENTION

In some embodiments of the present invention, method of routing data packets using a pseudo-route are presented including: receiving a data packet, the data packet having a destination; calculating the pseudo-route, if the destination corresponds with at least one of a plurality of software routing table routes, the pseudo-route having a most specific non-overlapping route mask derived from at least one of a plurality of overlapping software routing table routes; and routing the data packet using the pseudo-route. In some embodiments methods are presented further including: selecting a most specific route from the at least one of a plurality of software routing table routes corresponding with the destination. In some embodiments methods are presented further including: programmatically entering the pseudo-route into a hardware routing table. In some embodiments methods are presented further including: if the destination does not correspond with at least one of a plurality of software routing table routes, dropping or ignoring the received data packet. In some embodiments methods for calculating a pseudo-route are presented including: for each of the at least one of a plurality of overlapping software routing table routes, iteratively performing the following steps a-d: a) comparing an overlapping route mask with an incremental most specific route mask; b) comparing the destination with an incremental most specific route mask; c) if a results from step a) and step b) are equivalent, repeating the steps a), b), and c); and d) if a results from step a) and step b) are non-equivalent, storing the incremental most specific route mask as a non-overlapping route mask; selecting from the non-overlapping route masks the most specific non-overlapping route mask; and assigning the most specific non-overlapping route mask to the pseudo-route. In some embodiments methods are presented further wherein steps a) and b) utilize a bitwise operator.

In other embodiments, methods of calculating a pseudo-route are presented included: providing a destination; providing a plurality of overlapping routes corresponding with the destination; and calculating the pseudo-route, the pseudo-route having a most specific non-overlapping route mask derived from the plurality of overlapping routes. In some embodiments methods are presented for calculating a pseudo-route including: for each of the at least one plurality of overlapping routes, iteratively performing the following steps a-d: a) comparing an overlapping route mask with an incremental most specific route mask; b) comparing the destination with the incremental most specific route mask; c) if a results from step a) and step b) are equivalent, repeating the steps a), b), and c); and d) if a results from step a) and step b) are non-equivalent, storing the incremental most specific route mask as a non-overlapping route mask; selecting from the non-overlapping route masks the most specific non-overlapping route mask; and assigning the most specific non-overlapping route mask to the pseudo-route.

In other embodiments, methods of programmatically modifying a hardware routing table for use with a network router are presented including: receiving a data packet, the data packet having a destination; calculating the pseudo-route, if the destination corresponds with at least one of a plurality of software routing table routes, the pseudo-route having a most specific non-overlapping route mask derived from at least one of a plurality of overlapping software routing table routes; and programmatically entering the pseudo-route into the hardware routing table. In some embodiments, methods are presented for calculating a pseudo-route including: for each of the at least one of a plurality of overlapping software routing table routes, iteratively performing the following steps a-d: a) comparing an overlapping route mask with an incremental most specific route mask; b) comparing the destination with the incremental most specific route mask; c) if a results from step a) and step b) are equivalent, repeating the steps a), b), and c); and d) if a results from step a) and step b) are non-equivalent, storing the incremental most specific route mask as a non-overlapping route mask; selecting from the non-overlapping route masks the most specific non-overlapping route mask; and assigning the most specific non-overlapping route mask to the pseudo-route.

In other embodiments, systems of handling data packets are presented including: a data packet receiving module; a pseudo-route calculating module for calculating a pseudo-route, if a received packet destination corresponds with at least one of a plurality of software routing table routes, the pseudo-route having a most specific non-overlapping route mask derived from at least one of a plurality of overlapping software routing table routes; and a data packet routing module for routing a received data packet using the pseudo-route. In some embodiments, systems are further presented including a packet dropping module for dropping the received data packet if the received packet destination does not correspond with at least one of a plurality of software routing table routes.

In other embodiments, a computer program product for use in conjunction with a computer system for routing data packets using a pseudo-route is presented, the computer program product comprising a computer readable storage medium and a computer program mechanism embedded therein, the computer program mechanism including: instructions for receiving a data packet, the data packet having a destination; instructions for calculating a pseudo-route, if a received packet destination corresponds with at least one of a plurality of software routing table routes, the pseudo-route having a most specific non-overlapping route mask derived from at least one of a plurality of overlapping software routing table routes; and instructions for routing the data packet using the pseudo-route. In some embodiments, further computer program products are presented wherein the instructions for calculating a pseudo-route includes: for each of the at least one of a plurality of overlapping software routing table routes, instructions for iteratively performing the following steps a-d: a) comparing an overlapping route mask with an incremental most specific route mask; b) comparing the destination with the incremental most specific route mask; c) if a results from step a) and step b) are equivalent, repeating the steps a), b), and c); and d) if a results from step a) and step b) are non-equivalent, storing the incremental most specific route mask as a non-overlapping route mask; instructions for selecting from the non-overlapping route masks the most specific non-overlapping route mask; and instructions for assigning the most specific non-overlapping route mask to the pseudo-route.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
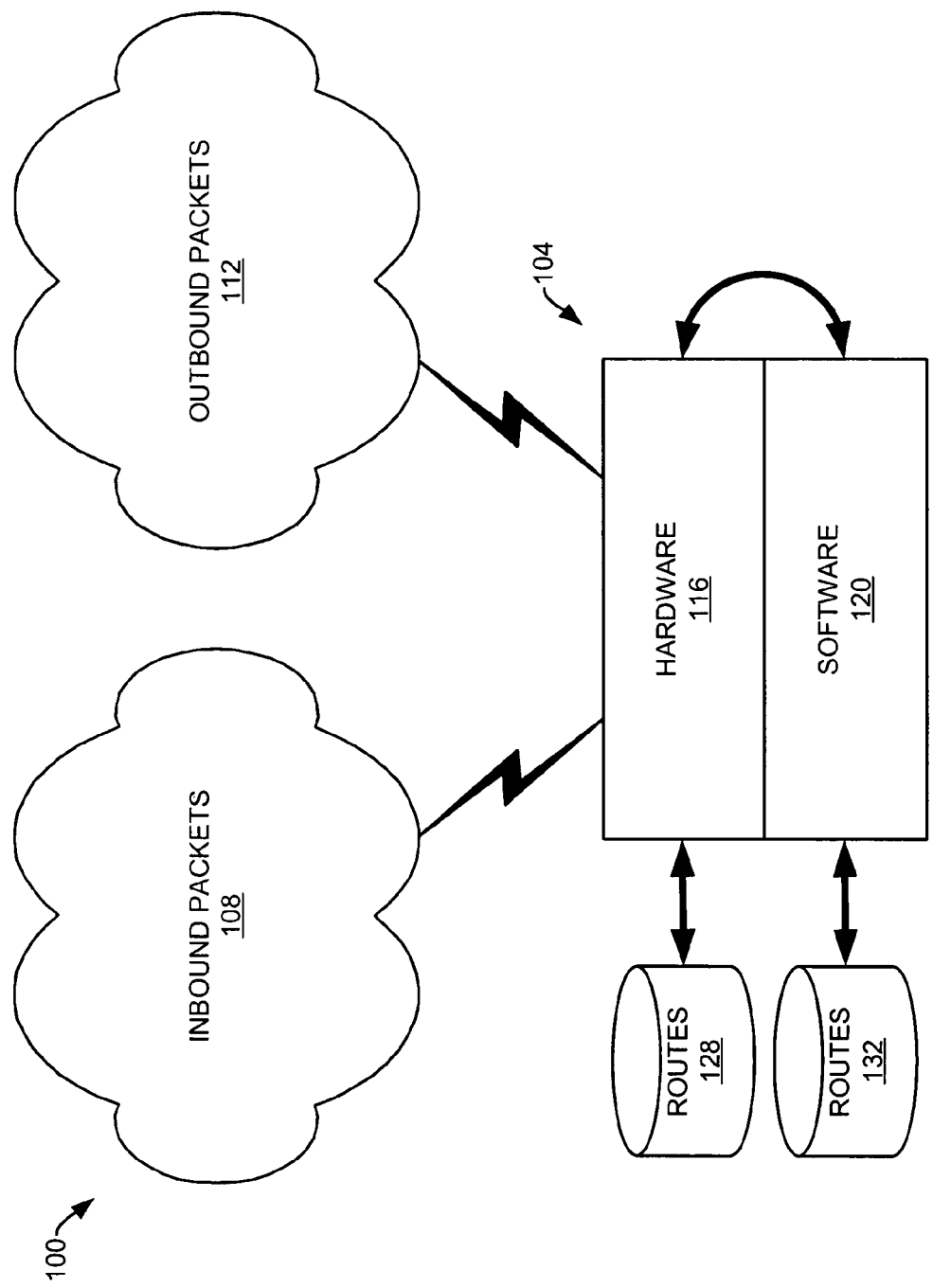
FIG. 1 is a diagrammatic illustration of an overview of a data transmission system in accordance with an embodiment of the present invention.

Turning to FIG. 1, FIG. 1 is a diagrammatic illustration of an overview of a data transmission system 100 in accordance with an embodiment of the present invention. As such, a router 104 may be configured to receive inbound packets 108 and to send outbound packets 112. One function of a router is to relay data packets from a sender to a destination. As can be appreciated, one or more routers may serve as relays in a data packet transmission path. Inbound packets 108 may be received from any of a number of sources well known in the art including, for example, data packets from the Internet, data packets from a WAN, data packets from a LAN, and data packets from a wireless network. In some embodiments, a router 104 may be further configured with a hardware component 116 and a software component 120. Hardware component 116 may also be configured with a hardware routing table 128. One purpose of a hardware component is to rapidly relay data packets along a known and resolved route. A known route is a route, of which a router is aware. Typically, a known route may be programmatically entered into a hardware or software routing table of a router. A resolved route is a known route that has been confirmed and programmed into hardware. That is, once a known route has received confirmation from an appropriate destination and that route has been programmatically entered into a hardware routing table that route becomes resolved.

As can be appreciated, hardware routing of data packets may be very fast. Because a hardware routing table route is a resolved route, additional processing cycles to determine an appropriate route are not required to route a data packet. An unresolved route, however, may require additional processing. Like hardware component 116, software component 120 may be configured with a software routing table 132. Software routing table 132 may typically be populated with known routes. When a data packet arrives at router 104, the data packet's destination may be checked against hardware routing table routes 128. If no hardware routing table route 128 exists corresponding to the data packet's destination, the router may then query software routing table 132. In those instances, software component 120 may determine the best route (i.e. most specific route) from a selection of software routes or may calculate a pseudo-route.

Figure 4:
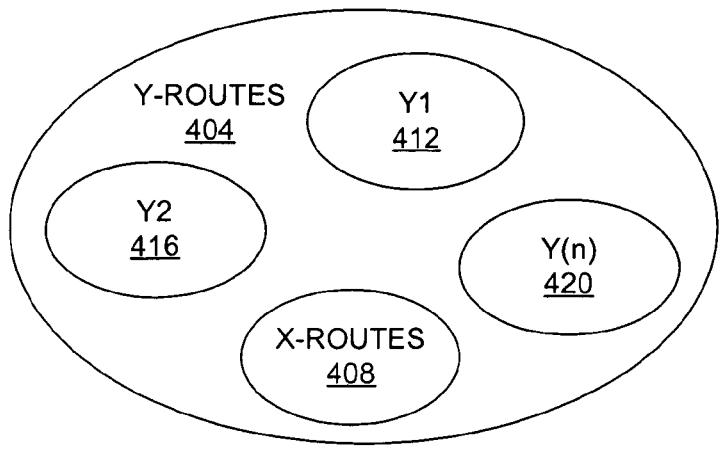
FIG. 4 is diagrammatic Venn diagram of theoretically possible pseudo-routes in accordance with an embodiment of the present invention.

A pseudo-route is a subset of routes that is non-overlapping with any other subset of routes. Turning briefly to FIG. 4, FIG. 4 is diagrammatic Venn diagram of theoretically possible pseudo-routes in accordance with an embodiment of the present invention. In this illustration, there exists a known set of y-routes 404. Of this set of y-routes, a subset of defined x-routes 408 may be known. All other routes that are not x-routes 408, which are subsets of y-routes 404 may be considered pseudo-routes (i.e. Y1 (412), Y2 (416), ... Y(n) (420)) For example, consider a y-route having an IP address destination as follows:

EXAMPLE 1

10.1.0.0/16

In this example, a subnet mask of 16 indicates that when considering this route, only the first 16 bits of the IP address are considered. Thus, IP addresses 10.1.0.0 to 10.1.255.255 comprise the range of possible valid destination IP addresses for this route. Further, a subset of destinations may be known which are represented by the following x-route having an IP address destination as follows:

EXAMPLE 2

10.1.2.0/24

In this example, a subnet mask of 24 indicates that when considering this route, only the first 24 bits of the IP address are considered. Thus, IP addresses 10.1.2.0 to 10.1.2.255 comprise the range of possible valid destination IP addresses for this route. As can be appreciated, this range of valid destination IP addresses represents a subset of the total valid destination IP addresses of the less specific 10.1.0.0/16 destination. Those y-routes 404 not represented by x-routes 408 are the set of theoretical pseudo-routes. Determination of software routes will be discussed in further detail below for FIGS. 2-3.

Returning to FIG. 1, in some embodiments, if software component 120 can determine an appropriate route or pseudo-route, software component 120 may communicate with hardware component 116 such that hardware routing table 128 may be programmatically modified to incorporate an appropriate route or pseudo-route. Further, once an appropriate route or pseudo-route is found, router 104 may then route outbound data packet 112.

Figure 2:
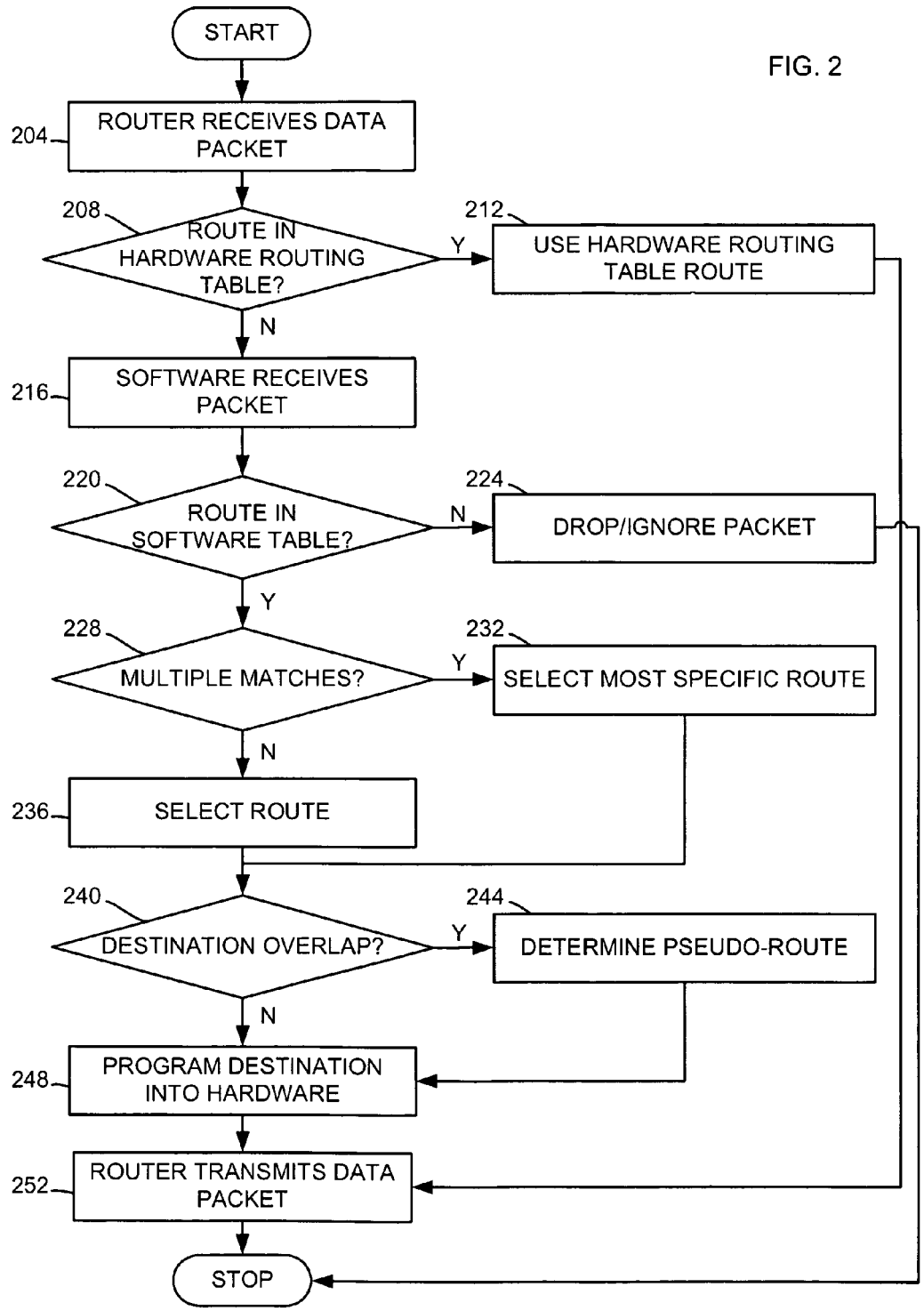
FIG. 2 is a diagrammatic flowchart illustrating a method of programming a hardware routing table and transmitting a data packet in accordance with an embodiment of the present invention.

Turning to FIG. 2, FIG. 2 is a diagrammatic flowchart illustrating a method of programming a hardware routing table and transmitting a data packet in accordance with an embodiment of the present invention. At a first step 204, a router receives a data packet. A data packet typically includes data and a destination. As noted above, data packets may be received from any of a number of sources well known in the art including, for example, data packets from the Internet, data packets from a WAN, data packets from a LAN, and data packets from a wireless network. In some embodiments, a data packet may not be received. That is, some embodiments of the present invention do not require a data packet to determine a pseudo-route. Rather, pseudo-routes may be calculated from a provided destination. Thus, in the present illustration, once a data packet is received, the method determines whether a route corresponding to the received data packet destination is present in a hardware routing table at a step 208. If the method determines that a hardware routing table route is present, then the method utilizes the hardware routing table route at a step 212 to send the received data packet to a destination at a step 252 whereupon the method ends. As noted above, where a hardware routing table route is present, routing a data packet using the hardware routing table route is generally very fast over utilizing a software routing table route. In some embodiments, using a hardware routing table route is many thousands of times faster than using a software routing table route.

If the method determines that a received data packet destination is not present in a hardware routing table, then a software component of a router receives the data packet at a step 216. The method then determines whether a software route corresponding to the received data packet destination is present in a software routing table route as a step 220. If a software routing table route is not present, the data packet may be dropped or ignored a step 224 whereupon the method ends. If a software route is present, the method then determines whether multiple matches exist at a step 228. Generally, a software route may contain at least a key (i.e. IP address) and a mask. For example, a route, 10.1.0.0/16 has an IP address of 10.1.0.0 and a mask of 16. The 16 refers to the number of significant bits in the key. In this example, the key could be written as 10.1.x.x, where x=0-255. The first 16 significant bits are represented by the 10 and the 1. Thus, in some routing tables having different keys with varying masks, there exists a possibility of multiple matches for a given IP address. For example, a multiple match for a table containing 10.1.0.0/16 and 10.1.2.0/24 would be returned for a destination of 10.1.2.5.

If multiple matches exist, then the method selects the software route having the most specificity at a step 232. Using the example above, the software route having the most specificity is the 10.1.2.0/24 route because it is significant to 24 bits unlike the 10.1.0.0/16 route which is only significant to 16 bits. If multiple matches do not exist, then a found software route in a software routing table is selected at a step 236. At a next step 240, the method determines whether an overlapping destination route exists. Using the above example, at least one overlapping destination route that may be returned is the 10.1.0.0/16 route. However, unlike matching routes as in a step 228, for a selected overlapping destination route, the set of more specific routes corresponding to the selected overlapping destination route would also be considered an overlapping route. In this manner, all overlapping routes may be selected. Thus, if a destination overlap exists at a step 240, then the method determines a pseudo-route at a step 244. Determination of a pseudo-route is discussed in further detail below for FIG. 3. Once a pseudo-route is determined, the pseudo-route is programmed into hardware at a step 248. If the method determines that a no destination overlap exists, then the selected route is programmed into hardware at a step 248. Once the route is programmed into hardware, the associated data packet may be transmitted at a step 252 whereupon the method ends.

Figure 3:
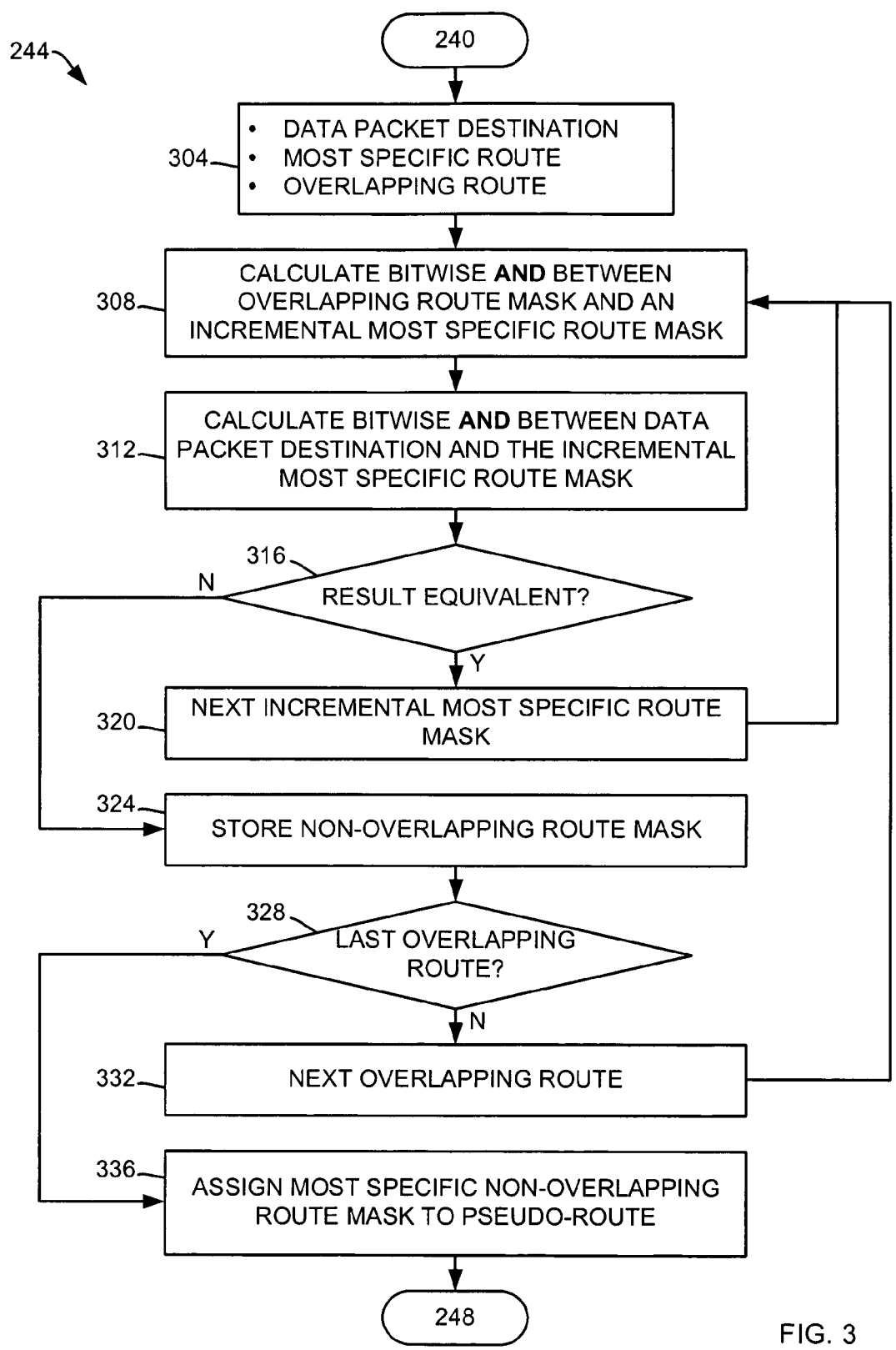
FIG. 3 is a diagrammatic flowchart illustrating a method of calculating a pseudo-route in accordance with an embodiment of the present invention.

Turning to FIG. 3, FIG. 3 is a diagrammatic flowchart illustrating a method of calculating a pseudo-route in accordance with an embodiment of the present invention. In particular, FIG. 3 further describes a step 244 (FIG. 2) in an embodiment of the present invention. At a first step 304 following a step 240, the method has identified at least three parameters: a) a data packet destination (see Step 204, FIG. 2); b) a most specific route (see Step 232, FIG. 2); and c) an overlapping route (see Step 240, FIG. 2). In subsequent steps, an incremental overlapping route mask will be compared to a specific route mask and a data packet destination mask. The incremental overlapping route mask will then be incremented and compared until no overlap exists. The resulting mask will then be applied to a data packet destination resulting in a pseudo-route. A specific example will follow the general discussion below in order to further clarify embodiments of the present invention.

Thus, at a step 308 a bitwise AND may be calculated between an incremental overlapping route mask and a most specific route mask. Generally speaking, a bitwise operator treats its operands as a vector of bits rather than as a single number. Bitwise operators are generally well-known in the art. As can be appreciated by one skilled in the art, other bitwise operators or even other methods of calculation may be utilized in determining whether respective routes overlap and are thus contemplated within the scope of the present invention. Furthermore, an increment, in accordance with an embodiment of the present invention, refers to a bit increment of a mask rather than a decimal increment as will be illustrated in further detail below for FIGS. 5-7. At a next step 312, a bitwise AND may be calculated between a data packet destination and a most specific route mask. As noted for a step 308, other bitwise operators or even other methods of calculation may be utilized in determining whether respective routes overlap and are thus contemplated within the scope of the present invention. The result of calculations from steps 308 and 312 may then be evaluated at a step 316. If the result is equivalent, the method then increments a most specific route mask by 1 and continues to a step 308. Equivalence at this step indicates that the routes under inspection are overlapping. Since pseudo-routes must be non-overlapping, then the incremental overlapping route mask currently under inspection is not appropriate for a pseudo-route.

If the method determines that a result is non-equivalent at a step 316, the method stores a non-overlapping route mask which has been generated from an incremental overlapping route mask. The method then determines whether the last overlapping route has been evaluated at a step 328. If the last overlapping route has not been evaluated, a next overlapping route is selected for evaluation at a step 332 whereupon the method returns to a step 308. Generally speaking, overlapping routes are not the same as matching routes although in some embodiments, they are the same. For example, a route 10.1.7.5 would "match" with a route 10.1.0.0/16, but would "overlap" without "matching" a route 10.1.2.0/24. All overlapping routes will be similarly evaluated with respect to a most specific route and a data packet destination.

When all overlapping routes have been evaluated, a most specific non-overlapping route mask may be assigned to a pseudo-route at a step 336 whereupon the method continues to a step 248.

Example Pseudo-Route Determination

Figure 5:
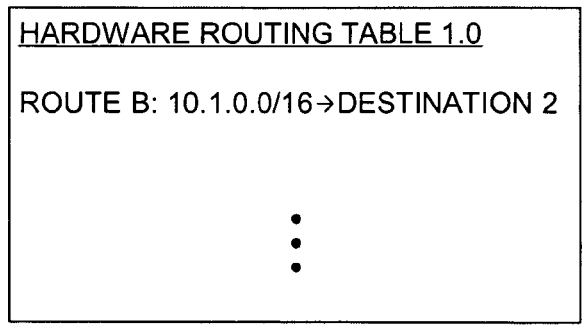
FIG. 5 is a diagrammatic representation of a portion of a hardware routing table in accordance with an embodiment of the present invention.
Figure 6:
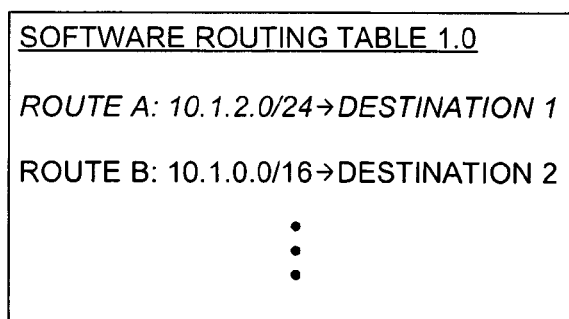
FIG. 6 is a diagrammatic representation of a portion of a software routing table in accordance with an embodiment of the present invention.

For purposes of this example embodiment, FIGS. 3 and 5-7 will be utilized. Referring first to FIG. 5, FIG. 5 is a diagrammatic representation of a portion of a hardware routing table in accordance with an embodiment of the present invention. The example hardware routing table 1.0 contains a route b: 10.1.0.0/16 corresponding to a destination 2. I can be appreciated that hardware routing tables may contain any number of routes in accordance with user preferences. FIG. 6 illustrates a diagrammatic representation of a portion of a software routing table in accordance with an embodiment of the present invention. In particular, software routing table includes route b (see FIG. 5) as well as unresolved route a: 10.1.2.0/24 corresponding to a destination 1. If a data packet having a destination of 10.1.7.5 were received and the method had selected route b as a most specific route and route a as an overlapping route, a calculation of a pseudo-route might proceed as follows:

| Step 308 (non-significant bits are shown in decimal or 'x') | |
|---|---|
| Most specific route | 10.1.00000000.xxxxxxxx (/16 mask) |
| Overlapping route | 10.1.00000010.xxxxxxxx |
| Bitwise AND result | 10.1.00000000.xxxxxxxx |

| Step 312 | |
|---|---|
| Most specific route | 10.1.00000000.xxxxxxxx (/16 mask) |
| Data packet | 10.1.00000111.xxxxxxxx (using a /16 mask) |
| Bitwise AND result | 10.1.00000000.xxxxxxxx |

Step 316

Result equivalent=true→Step 320

The method iteratively increases a most specific route mask until a /22 mask is examined:

| Step 308 (non-significant bits are shown in decimal or 'x') | |
|---|---|
| Most specific route | 10.1.11111100.xxxxxxxx (/22 mask) |
| Overlapping route | 10.1.00000010.xxxxxxxx |
| Bitwise AND result | 10.1.00000000.xxxxxxxx |

| Step 312 | |
|---|---|
| Most specific route | 10.1.111111.xxxxxxxx (/22 mask) |
| Data packet | 10.1.00000111 (using a /16 mask) |
| Bitwise AND result | 10.1.00000100.xxxxxxxx |

Step 316

Result equivalent=false→Step 324: Store non-overlapping route mask

Figure 7:
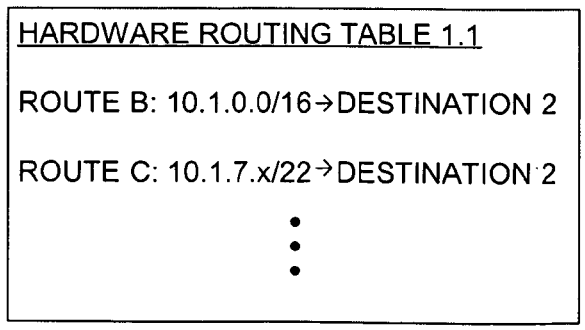
FIG. 7 is a diagrammatic representation of a portion of a modified hardware routing table in accordance with an embodiment of the present invention.

The method then continues until all overlapping routes are considered whereupon the method assigns the most specific non-overlapping route mask to pseudo-route, which may then be written to hardware routing table at a step 248 (see FIG. 2). As can be appreciated, a most specific non-overlapping route mask is that mask having the highest numeric value which corresponds to the highest number of significant bits as noted above. FIG. 7 is a diagrammatic representation of a portion of a modified hardware routing table in accordance with an embodiment of the present invention. In particular, route c: 10.1.7.0/22 corresponding to a destination 2 may be added to hardware routing table 1.1.

While this invention has been described in terms of several embodiments, there are alterations, permutations, and equivalents, which fall within the scope of this invention. It should also be noted that there are many alternative ways of implementing the methods and apparatuses of the present invention. For example, steps 308 and 316 utilize bitwise operator AND to determine whether routes overlap. One skilled in the art can appreciate that other bitwise operators or even other methods of calculation may be utilized in determining whether respective routes overlap and are thus contemplated within the scope of the present invention. Further, as noted for FIG. 2 above, some embodiments of the present invention do not require, as a limitation, receiving a data packet. One skilled in the art can readily appreciate that pseudo-routes may be calculated from a user specified destination using embodiments described herein. It is therefore intended that the following appended claims be interpreted as including all such alterations, permutations, and equivalents as fall within the true spirit and scope of the present invention.

What is claimed is:

1. At least one non-transitory computer readable storage medium including instructions that when executed by a computer system performs a method of routing data packets using a pseudo-route, the method comprising:

receiving a data packet, the data packet having a destination address;

obtaining the destination address of the received data packet;

selecting a most specific route from a plurality of software routing table routes, wherein the most specific route contains the obtained destination address of the data packet;

determining whether the selected most specific route overlaps at least one other route of the plurality of software routing table routes;

if the selected most specific route overlaps at least one other route of the plurality of software routing table routes, calculating the pseudo-route using the obtained destination address of the received data packet, wherein the pseudo-route has a route mask that is most specific for the destination address of the received data packet and has no overlap with the at least one other route of the plurality of software routing table routes, and wherein calculating the pseudo-route comprises comparing an incremental overlapping route mask to the specific route mask and a mask of the destination address of the received data packet; and routing the data packet using the calculated pseudo-route.

2. The at least one non-transitory computer readable storage medium of claim 1, wherein the method further comprises: programmatically entering the pseudo-route into a hardware routing table.

3. The at least one non-transitory computer readable storage medium of claim 1, wherein the method further comprises:

if the destination address of the received data packet does not correspond with at least one of the plurality of software routing table routes, dropping or ignoring the received data packet.

4. The at least one non-transitory computer readable storage medium of claim 1, wherein calculating the pseudo-route comprises:

for each of the at least one other route of the plurality of software routing table routes, iteratively performing the following steps a-d:

a) comparing an overlapping route mask with the incremental most specific route mask;

b) comparing the mask of the destination address of the received data packet with the incremental most specific route mask;

c) if a results from step a) and step b) are equivalent, repeating the steps a), b), and c); and d) if a results from step a) and step b) are non-equivalent, storing the incremental most specific route mask as a non-overlapping route mask;

selecting from the non-overlapping route masks the most specific non-overlapping route mask; and assigning the most specific non-overlapping route mask to the pseudo-route.

5. The at least one non-transitory computer readable storage medium of claim 4, wherein steps a) and b) utilize a bitwise operator.

6. At least one non-transitory computer readable storage medium including instructions that when executed by a computer system performs a method of calculating a pseudo-route for routing a received data packet having a destination address, the method comprising:

obtaining the destination address of the received data packet;

selecting a most specific route from a plurality of software routing table routes, wherein the most specific route contains the obtained destination address of the received data packet;

determining whether the selected most specific route overlaps at least one other route of the plurality of software routing table routes; and if the selected most specific route overlaps at least one other route of the plurality of software routing table routes, calculating the pseudo-route using the obtained destination address of the received data packet, wherein the pseudo-route has a route mask that is most specific for the destination address of the received data packet and has no overlap with the at least one other route of the plurality of software routing table routes, and wherein calculating the pseudo-route comprises comparing an incremental overlapping route mask to the specific route mask and a mask of the destination address of the received data packet.

7. The at least one non-transitory computer readable storage medium of claim 6, wherein the method further comprises: programmatically entering the pseudo-route into a software routing table.

8. The at least one non-transitory computer readable storage medium of claim 6, wherein the method further comprises: programmatically entering the pseudo-route into a hardware routing table.

9. The at least one non-transitory computer readable storage medium of claim 6, wherein calculating the pseudo-route comprises:
for each of the at least one other route of the plurality of software routing table routes, iteratively performing the following steps a-d:
a) comparing an overlapping route mask with the incremental most specific route mask;
b) comparing the mask of the destination address of the received data packet with the incremental most specific route mask;
c) if a results from step a) and step b) are equivalent, repeating the steps a), b), and c); and
d) if a results from step a) and step b) are non-equivalent, storing the incremental most specific route mask as a non-overlapping route mask;
selecting from the non-overlapping route masks the most specific non-overlapping route mask; and
assigning the most specific non-overlapping route mask to the pseudo-route.

10. The at least one non-transitory computer readable storage medium of claim 9, wherein steps a) and b) utilize a bitwise operator.

11. A method of programmatically modifying a hardware routing table for use with a network router comprising:
receiving a data packet, the data packet having a destination;
obtaining the destination address of the received data packet;
selecting a most specific route from a plurality of software routing table routes, wherein the most specific route contains the obtained destination address of the data packet;
determining whether the selected most specific route overlaps at least one other route of the plurality of software routing table routes;
if the selected most specific route overlaps at least one other route of the plurality of software routing table routes, calculating the pseudo-route using the obtained destination address of the data packet,
wherein the pseudo-route has a route mask that is most specific for the destination address of the data packet and has no overlap with the at least one other route of the plurality of software routing table routes, and
wherein calculating the pseudo-route comprises comparing an incremental overlapping route mask to the specific route mask and a mask of the destination address of the received data packet; and
programmatically entering the pseudo-route into the hardware routing table.

12. The method of claim 11 wherein calculating the pseudo-route comprises:
for each of the at least one other route of the plurality of software routing table routes, iteratively performing the following steps a-d:
a) comparing an overlapping route mask with the incremental most specific route mask;
b) comparing the mask of the destination address of the received data packet with the incremental most specific route mask;
c) if a results from step a) and step b) are equivalent, repeating the steps a), b), and c); and
d) if a results from step a) and step b) are non-equivalent, storing the incremental most specific route mask as a non-overlapping route mask;
selecting from the non-overlapping route masks the most specific non-overlapping route mask; and
assigning the most specific non-overlapping route mask to the pseudo-route.

13. The method of claim 11 wherein steps a) and b) utilize a bitwise operator.

14. A system of handling data packets comprising:
a data packet receiving module for receiving at least one data packet having a destination address and obtaining the destination address of the received data packet;
a selecting module for selecting a most specific route from a plurality of software routing table routes, wherein the most specific route contains the obtained destination address of the received data packet;
a determining module for determining whether the selected most specific route overlaps at least one other route of the plurality of software routing table routes;
a pseudo-route calculating module for calculating a pseudo-route using the obtained destination address of the data packet, if the selected most specific route overlaps with at least one other route of the plurality of software routing table routes,
wherein the pseudo-route has a route mask that is most specific for the destination address of the data packet and have no overlap with the at least one other route of the plurality of software routing table routes, and
wherein calculating the pseudo-route comprises comparing an incremental overlapping route mask to the specific route mask and a mask of the destination address of the received data packet; and
a data packet routing module for routing a received data packet using the calculated pseudo-route.

15. The system of claim 14 further comprising:
a hardware routing table, the hardware routing table configured to route the received data packet if the hardware routing table contains a hardware routing table route corresponding with the received data packet.

16. The system of claim 14 further comprising:
a programming module for programmatically entering the pseudo-route into the hardware routing table.

17. The system of claim 14 further comprising:
a packet dropping module for dropping the received data packet if the received packet destination does not correspond with at least one of a plurality of software routing table routes.

18. A non-transitory computer readable medium including instructions for use in conjunction with a computer system for routing data packets using a pseudo-route, the non-transitory computer readable medium comprising a non-transitory computer readable storage medium and a computer program mechanism embedded therein, the computer program mechanism comprising:
instructions for receiving a data packet, the data packet having a destination;
instructions for obtaining the destination address of the received data packet;
instructions for selecting a most specific route from a plurality of software routing table routes, wherein the most specific route contains the obtained destination address of the received data packet;
instructions for determining whether the selected most specific route overlaps at least one other route of the plurality of software routing table routes;
instructions for calculating the pseudo-route using the obtained destination address of the received data packet, if the selected most specific route overlaps with at least one other route of the plurality of software routing table routes, wherein the pseudo-route has a route mask that is most specific for the destination address of the received data packet and has no overlap with the at least one other route of the plurality of software routing table routes, and wherein calculating the pseudo-route comprises comparing an incremental overlapping route mask to the specific route mask and a mask of the destination address of the received data packet; and instructions for routing the data packet using the calculated pseudo-route.

19. The non-transitory computer readable medium of claim 18 further comprising instructions for programmatically entering the pseudo-route into a hardware routing table.

20. The non-transitory computer readable medium of claim 18 further comprising: if the destination does not correspond with at least one of a plurality of software routing table routes, instructions for dropping or ignoring the data packet.

21. The non-transitory computer readable medium of claim 18 wherein the instructions for calculating a pseudo-route comprises:

for each of the at least one other route of the plurality of software routing table routes, instructions for iteratively performing the following steps a-d:
a) comparing an overlapping route mask with the incremental most specific route mask;
b) comparing the mask of the destination address of the received data packet with the incremental most specific route mask;
c) if a results from step a) and step b) are equivalent, repeating the steps a), b), and c); and
d) if a results from step a) and step b) are non-equivalent, storing the incremental most specific route mask as a non-overlapping route mask;

instructions for selecting from the non-overlapping route masks the most specific non-overlapping route mask; and instructions for assigning the most specific non-overlapping route mask to the pseudo-route.

22. The non-transitory computer readable medium of claim 21 wherein steps a) and b) utilize a bitwise operator.

* * * * *